United States Patent

De Rycke et al.

[11] Patent Number: 5,080,126
[45] Date of Patent: Jan. 14, 1992

[54] FLOAT CONTROLLED VALVE

[75] Inventors: Edward F. De Rycke, Shortsville; Gordon F. Leonard, Spencerport; Robert D. MacArthur, Rochester, all of N.Y.

[73] Assignee: R. P. Fedder Corporation, Rochester, N.Y.

[21] Appl. No.: 637,340

[22] Filed: Jan. 4, 1991

[51] Int. Cl.⁵ ............................................. F16K 31/26
[52] U.S. Cl. ..................................... 137/209; 137/416; 137/445; 137/195; 137/413; 251/65; 417/126
[58] Field of Search ............... 251/65; 137/445, 413, 137/414, 415, 416, 204, 195, 209; 417/126, 128

[56] References Cited

U.S. PATENT DOCUMENTS

| | | | |
|---|---|---|---|
| 1,779,319 | 10/1930 | Jennings | 417/128 |
| 2,730,961 | 1/1956 | Yeomans | 417/128 X |
| 2,752,932 | 7/1956 | Newboult | 251/65 X |
| 2,893,427 | 7/1959 | Felgate | 251/65 X |
| 4,321,017 | 3/1982 | Gottliebson | 417/128 |

Primary Examiner—Alan Cohan
Attorney, Agent, or Firm—Cumpston & Shaw

[57] ABSTRACT

A float controlled valve has a float chamber for accumulating a fluid, a pivoting float arm having a float mounted on one end thereof for fluid level determined movement within the chamber, a pivotally mounted actuator arm coupled to the float arm by a magnet driver and having a first magnet mounted at one end of the actuator arm; a pivotally mounted control arm having a second magnet attached thereto, in magnet coupling relationship with the first magnet, and valve means coupled to the pivotally mounted control arm for controlling fluid flow from the chamber in response to movement of the float.

33 Claims, 4 Drawing Sheets

FLOAT CONTROLLED VALVE

This invention relates generally to a float controlled valve, and more particularly to a drain trap assembly for eliminating condensate from a pressurized air system incorporating a new float controlled valve assembly for controlling the operation of a pilot valve.

There is a need in compressed air systems for apparatus for eliminating moisture from the air supply. If water is allowed to collect in a compressed air system, it may cause premature corrosion. In addition, a sufficient amount of water will sometimes collect to cause a blockage, creating potentially destructive water hammer effects.

Moisture naturally accumulates in compressed air systems, because compressing air causes the moisture that is normally present in the uncompressed air to condense out. In high capacity industrial applications, large volumes of air are compressed, and existing apparatus for removing moisture from such systems tended to be physically large and expensive. Relatively large amounts of water, for example, one hundred or more pounds per hour of operation, condense out of such systems, and must be removed. Because water is more dense than air, it is convenient to place a drain trap assembly at a low point in the compressed air system, at which point condensed water will normally accumulate. A drain trap assembly must remove the water that collects in the system, while allowing the system to maintain its designed pressure. Oftentimes, pressures as high as 100 to 150 lbs. per square inch are present.

There is a need for apparatus for removing condensed water from such compressed air systems. Preferably, a drain valve is provided that operates automatically to periodically remove water from the compressed air system during normal operation of the system. It is desirable to allow a quantity of water to accumulate over time, and then to remove the collected water all at once. This minimizes the pressure reducing effects of the water elimination process.

In addition to removing condensed moisture from compressed air systems, float valve assemblies of the type to which the present invention relates are also useful in other applications. Pressure operated pumps are pumps that move fluids using compressed air, rather than electric or hydraulically operated pumps. Further, steam generating systems also require that condensed moisture be removed and the float controlled valve of this invention is useful in such systems.

Briefly stated and in accordance with a Presently preferred aspect of the invention, a float controlled valve is provided having a float chamber for accumulating a fluid, a pivoting float arm having a float mounted on one end thereof for fluid level determined movement within the chamber, a pivotally mounted actuator arm coupled to the float arm by a magnet driver and having a first magnet mounted at one end of the actuator arm; a pivotally mounted control arm having a second magnet attached thereto, in magnet coupling relationship with the first magnet, and valve means coupled to the pivotally mounted control arm for controlling fluid flow from the chamber in response to movement of the float.

In accordance with another aspect of this invention, a bracket is provided within the float chamber and the pivotable float arm and actuator arm are each mounted on the bracket.

In accordance with another aspect of the invention, the bracket mounted within the float chamber includes spaced apart pivot points for mounting the float and actuator arm respectively.

In accordance with still another aspect of this invention, the valve coupled to the pivotally mounted control arm includes first and second colinear opposed valve assemblies, and a valve shuttle disposed between the first and second assemblies, and coupled to the pivotally mounted control arm for alternately opening one assembly and closing the other, depending upon the position of the control arm.

In accordance with a still further aspect of this invention, the first and second magnets on the actuator arm and control arm are arranged in magnetically repelling relationship.

In accordance with a still further embodiment of the invention, the float chamber is sealed by a magnetically permeable seal disposed between the first and second magnets.

In accordance with a still further embodiment of the invention, a pressure operated drain valve is coupled to the float chamber, the drain valve being controlled by compressed air applied through the colinear opposed valve assemblies.

In accordance with a still further embodiment of the invention, linkage between the pivotable float arm and the pivotally mounted actuator arm is provided for introducing a hysteresis effect to increase the amount of fluid that can be removed in one cycle of the float controlled valve.

While the novel aspects of the invention are set forth with particularity in the appended claims, the invention itself, together with further objects and advantages thereof may be more fully comprehended by reference to the following detailed description of the invention, taken in conjunction with the accompanying drawings, in which:

Figure 1:
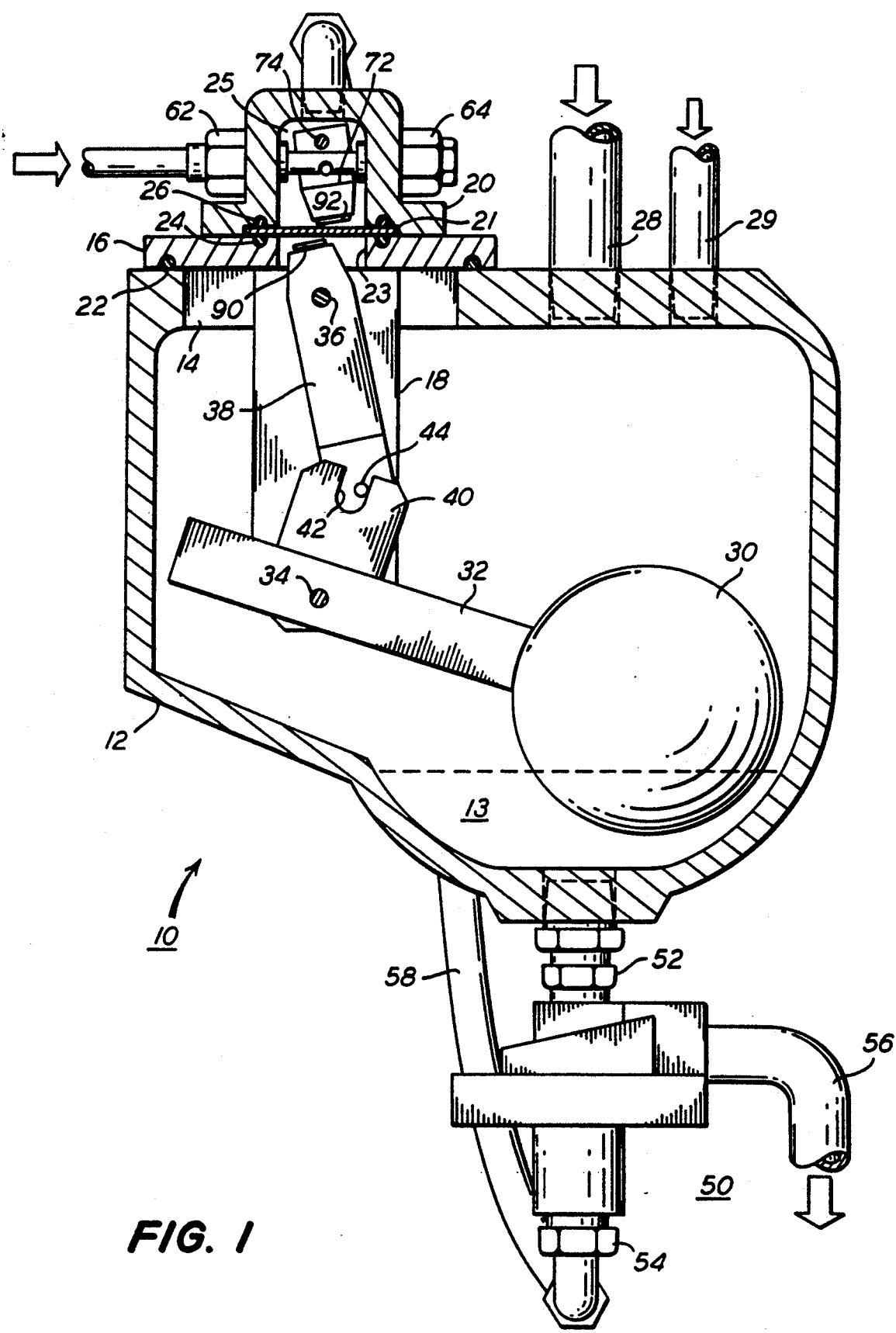
FIG. 1 is a side elevation, partly in section, of a portion of a float controlled valve in accordance with this invention.

Referring now to FIG. 1, a float controlled valve assembly 10 in accordance with this invention is illustrated. The assembly includes a chamber or housing 12 for accumulating a quantity of liquid 13. The housing is preferably made from a material that will resist corrosion by the liquid involved, as is per se well known in the art.

Preferably the housing is formed from aluminum, and various threaded fittings described below are brass.

An opening 14 is formed in the top wall of the housing 12, and is large enough to receive the float and bracket mechanism described below therethrough, in assembling the float controlled valve. Cover plate 16 is mechanically attached to the housing 12 to cover opening 14, by conventional bolts or the like, and an O-ring seal 22 is preferably provided between the housing and the cover plate. Cover plate 16 has a central opening 23 that is aligned with a cavity 25 in upper valve housing 20. The cavity 25 is closed by a magnetically permeable disk 21, positioned between cover plate 16 and valve housing 20, and sealed by O-rings 24 and 26. The assembly thus far described forms a sealed chamber within housing 12 that can be attached to and pressurized by a compressed air system via input line 28, which is preferably connected, as described above, to a physically low point in the compressed air system, where moisture is likely to collect. Secondary line 29 is preferably connected to the compressed air system at high point, where scale, rust and the like are not likely to be present. Thus, in the event that line 28 becomes contaminated or blocked by such residue, pressure will be maintained by secondary line 29.

Flat bracket 18, which is preferably attached to the underside of cover plate 16 by screws or the like, supports the elements of the float control valve assembly that are disposed within the housing 12. Specifically, bracket 18 includes first and second pivot points 34 and 36, for supporting float arm 32 and primary magnet arm 38 respectively. Preferably, float bracket 18 is a generally U-shaped bracket, only part of which is shown in the drawing for simplicity, and the pivot points are clevis pins, dowel pins, or the like, that extend through the bracket, and may be secured by cotter pins, by pinning, or any other well known technique.

Float arm 32 is coupled to primary magnet arm or actuator arm 38, by a linkage including an actuating bracket 40 that is connected to float arm 32 at pivot 34, and extends orthogonally with respect thereto to a distal end having a U-shaped recess 42. A driving pin 44 is staked to primary magnet arm 38 and extends into recess 42 for linking float arm 32 and actuator arm 38 by way of actuating bracket 40.

Pressure operated shut off valve assembly 50 is connected to the bottom of housing 12 by standard coupling 52, which provides fluid communication between the housing and the shut off valve. The valve includes a pressure input 54, a fluid input and a fluid drain 56. In operation, when no pressure is applied to input 54, the valve remains open and any fluid 13 present in the housing drains through the valve fluid drain 56. When pressure is applied from input 54, the valve closes and the housing is sealed to collect an additional quantity of fluid prior to a subsequent discharge. Preferably, valve assembly 50 is a Deltrol No. BD25A shut-off valve.

Figure 3:
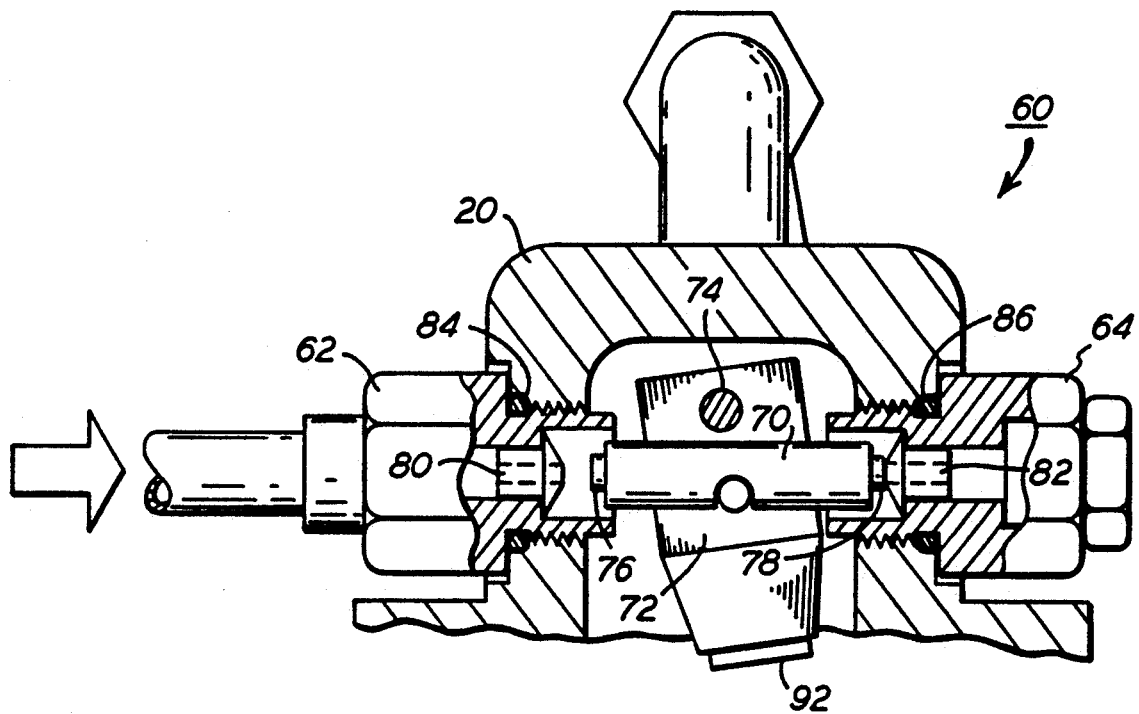
FIG. 3 is an enlarged fragment of the pilot valve assembly of the float controlled valve of FIG. 1, shown partly in section.

Valve 50 is controlled by pilot valve 60, shown in more detail in FIG. 3. The pilot valve assembly is formed in valve housing 20, already described, and includes an inlet 62, an outlet 64, and a tube coupling the pilot valve 60 to pressure input 54 of shut-off valve 50.

Valve shuttle 70 is disposed, within housing 20 and driven reciprocally by control arm 72. The control arm is pivotally mounted on a pivot post 74, attached to housing 20 in any convenient fashion, such as by adjustable trunions. It will be appreciated by reference to FIG. 3 that pivotal movement of the control arm produces substantially linear movement of shuttle 70. A pair of resilient sealing plugs 76 and 78 are mounted in recesses in opposed ends of valve shuttle 70 for engaging and sealing valve seats 80 and 82 respectively, mounted in inlet and outlet fittings 62 and 64. The resilient sealing plugs 76, 78 may be formed from any resilient material, but preferably from rubber O-ring cored 0.210" in diameter. The valve seats are preferably stainless steel.

Inlet and outlet couplings 62, 64 are preferably sealed to the valve housing 20, by O-ring seals 84, 86.

Pilot valve inlet 62 is preferably connected to a source of compressed air, which is even more preferably the same source of compressed air as is being drained by the float control valve assembly. Preferably, inlet 62 is connected to the source at a high point, to minimize moisture that is introduced into the pilot valve assembly 20. The outlet 64 is exhausted to the atmosphere. Thus in operation, in the two positions of valve shuttle 70, pressurized air is either supplied to pressure input 54 of shut-off valve 50, or the input is coupled to the atmosphere. When pressure is supplied, the valve is closed, and when pressure is removed, the valve opens allowing the housing to drain. This ensures that the shut-off valve opens, and drainage occurs if the compressor fails for any reason.

The float controls the position of the pilot valve through the use of magnets, 90 and 92 mounted in the ends of actuator arm 38, and a control arm 72 respectively. The magnets are arranged so that like poles face another across a gap between the magnets in which magnetically permeable disk 21 is disposed. Magnetically permeable disk 21 may be made of non-magnetic stainless steel, or aluminum or the like. Because like poles of the magnets are presented to each other, the ends of the magnet arms tend to repel each other, thereby causing the primary and secondary magnet arms to assume opposite positions. That is, when the upper end of primary magnet arm 38 is inclined to the left, as shown in FIG. 1, the repulsive force on magnet 92 causes secondary magnet arm 72 to pivot to the right. The opposite condition is shown in FIG. 2.

Figure 2:
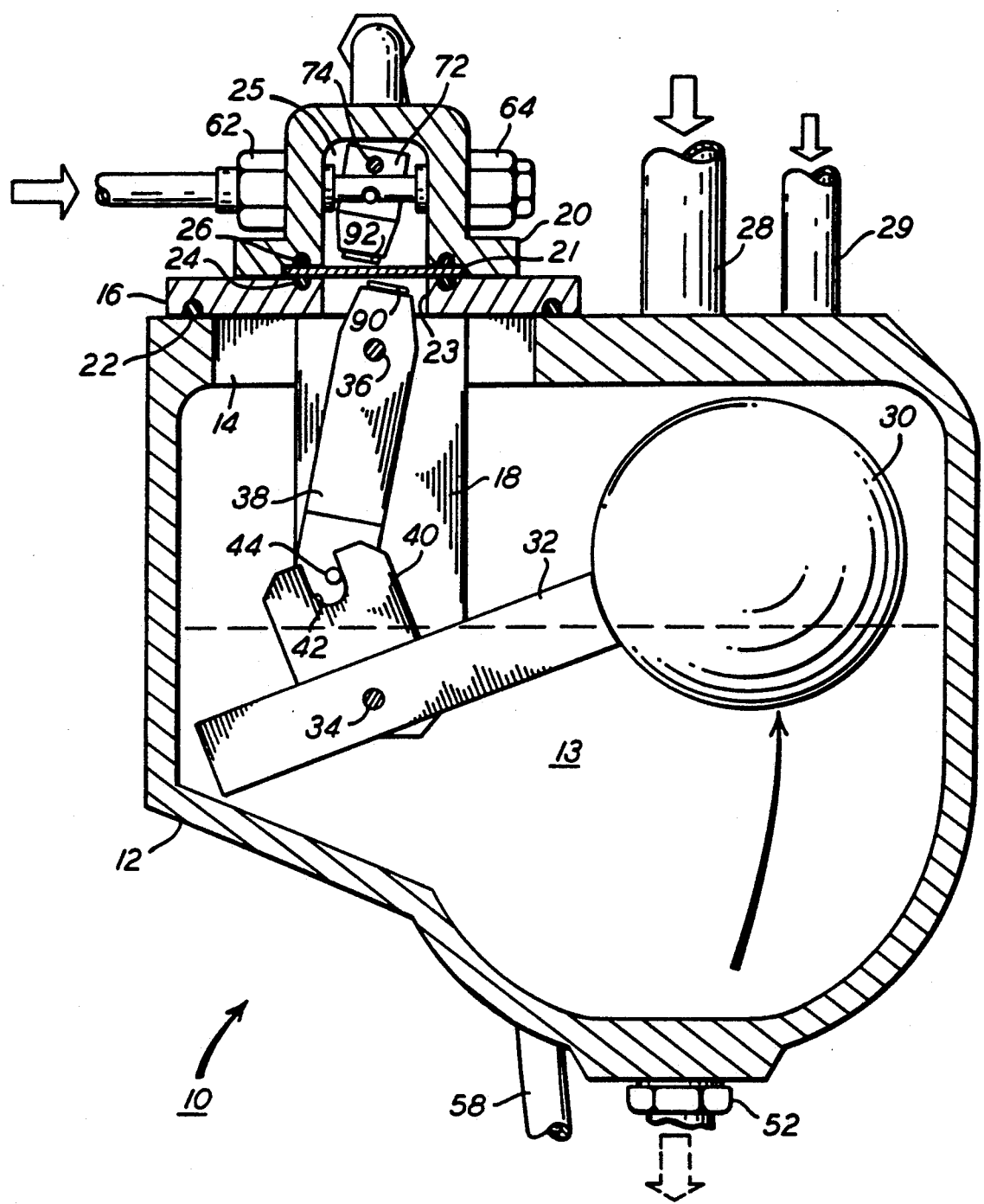
FIG. 2 is a side elevation, partly in section, of the float controlled valve of FIG. 1 showing the float in a raised position, as the chamber substantially fills with fluid.

By referring now to FIGS. 1 and 2, the operation of the float control valve will be readily comprehended. As shown in FIG. 1, a small amount of fluid 13 has accumulated in housing 12 and float 30 is in a position only slightly raised above the bottom of the housing. Float arm 32 is inclined downwardly (viewed from left to right) and magnet driver 40 is just beginning to urge pin 44 to the left. The upper end of primary magnet arm 39 and accordingly magnet 90 are inclined to the left, thus urging secondary magnet arm 72 to the right, closing exhaust 64, opening inlet 62, and pressurizing line 58 to cause shut-off valve 50 to close, so that fluid can accumulate in the housing 12.

As the fluid level rises to the position shown in FIG. 2, the drain trap operates automatically to empty. As float 30 rises, magnet driver 40 urges pin 44 to the left, pivoting magnet 90 from left to right. This increases the force tending to urge secondary magnet arm 72 to the right, until magnet 90 and primary magnet arm 38 has moved slightly past a position in alignment with magnet 92 on secondary magnet arm 72. At this point, the force on secondary magnet 92 changes from a left to right force, to a right to left force, and the secondary magnet arm 72 snaps suddenly to the position shown in FIG. 2. This causes shuttle 70 to move suddenly from right to left, opening outlet 64 and closing inlet 62. This relieves the pressure applied to shut-off valve 50, via tube 58, and causes the valve to open. Fluid is drained into a convenient sump or the like, through fluid drain 56, and float 30 drops. It will be appreciated by reference to FIG. 2, that as float 30 drops, magnet driver 40 initially moves without affecting pin 44, due to the width of slot 42. This allows the float to drop a substantial distance before the magnet driver begins to urge pin 44 to the right, as shown in FIG. 2, thereby increasing the capacity of housing 12 to hold fluid. This hysteresis effect increases the capacity of the housing over that which would be achieved if pin 44 were directly coupled to magnet driver 40. The same effect occurs at the bottom of the float stroke, as the float begins to rise. Initially, prior to assuming the position shown in FIG. 1, pin 44 will be proximate the left edge of slot 42. Only when the float rises to the position shown in FIG. 1, does magnet driver 40 begin to urge pin 44 to the left.

By increasing the volume of liquid that can be collected in the housing, the hysteresis linkage of the present invention increases the time between drainage cycles. By discharging the larger amount of fluid in each drainage cycle, and thus reducing the number of cycles needed to drain a given quantity of fluid, wear on the valve is reduced, and reduction in compressed air pressure, due to bleeding during evacuation of liquid, is reduced.

While a variety of materials may be used in fabricating the float control valve of this invention, stainless steel is a presently preferred material. Aluminum or any other material that resists corrosion by water may also be used for the housing. With particular regard to the primary and secondary magnet arms, non-magnetizable stainless steel, such as Series 300 stainless steel, should be used. The magnets themselves are preferably neodymium-iron magnets that may be $\frac{3}{8}$" diameter, $\frac{1}{4}$" long cylinders, glued in the end of the primary and secondary magnet arms. Because the magnets repel, once the float control valve is assembled, they tend to hold themselves in place.

Figure 4:
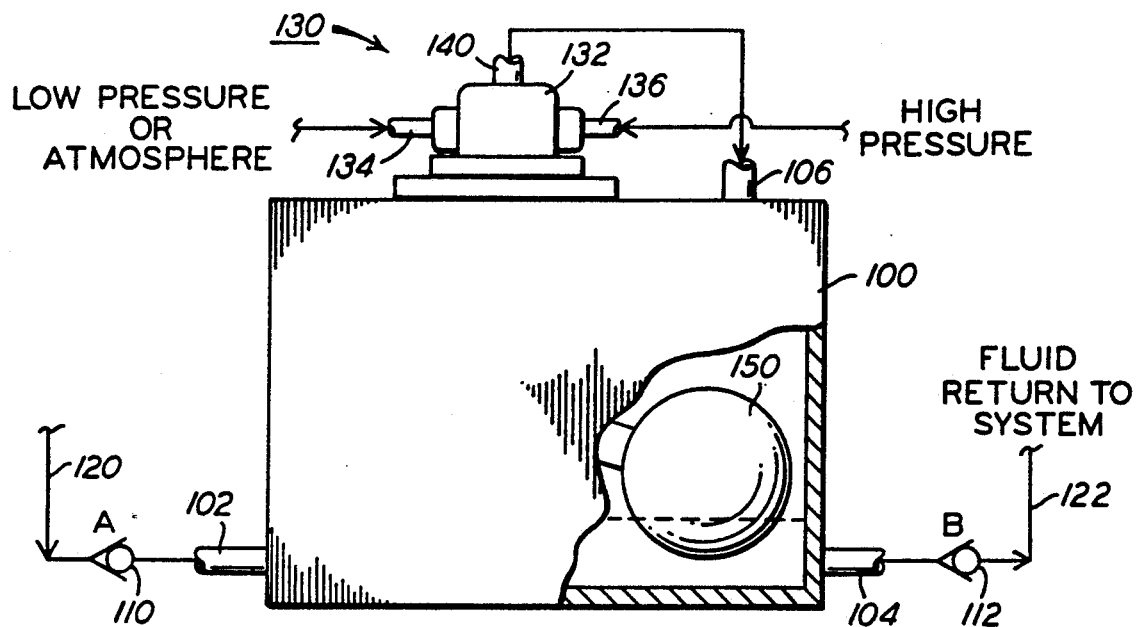

Although the float controlled valve of this invention is particularly useful in draining accumulated fluids from compressed air systems, it may also be employed in other applications. FIG. 4 shows a float controlled valve in accordance with this invention, in an implementation of a pressure operated pump. A sealed tank 100 has a fluid inlet 102 and a fluid outlet 104. The tank is sealed to the extent that it can be pressurized by compressed air or the like, applied to pressurization input 106. Fluid inlet 102 is connected to a conventional one-way check valve 110 that allows fluid to flow freely into tank 100, but prevents fluid from flowing out of the tank. Fluid outlet 104 is connected to an oppositely directed check valve 112, that permits fluid to flow out of the tank, but not in. Check valve 110 is connected to a pumping input 120, while check valve 112 is connected to a pumping outlet 122. A float operated valve in accordance with this invention is mounted in tank 100, to control the application of high pressure air or other gas to the tank to accomplish the pumping action. Float valve 130 has its pilot valve assembly 132 connected with first input 134, connected to a relatively low pressure or atmospheric pressure source or vent, and its second input 136 connected to a high pressure source of air or other driving fluid. Pilot valve of outlet 140 is connected to pressure input 106 of tank 100. The pilot valve assembly is connected such that when float 150 is down, no pressure is applied to pressure input 106, and tank 100 fills normally from inlet supply line 120 through check valve 110. As the fluid level rises, float 150 is raised up, pilot valve 130 switches to connect outlet 140 to high pressure source 136, thereby pressurizing the tank, stopping the flow of fluid through check valve 110, and causing the fluid to flow outwardly through check valve 112. As the fluid level drops, the float drops and the process is repeated. Thus a pump is provided with substantially no moving aparts, aside from the float controlled valve assembly.

Figure 5:
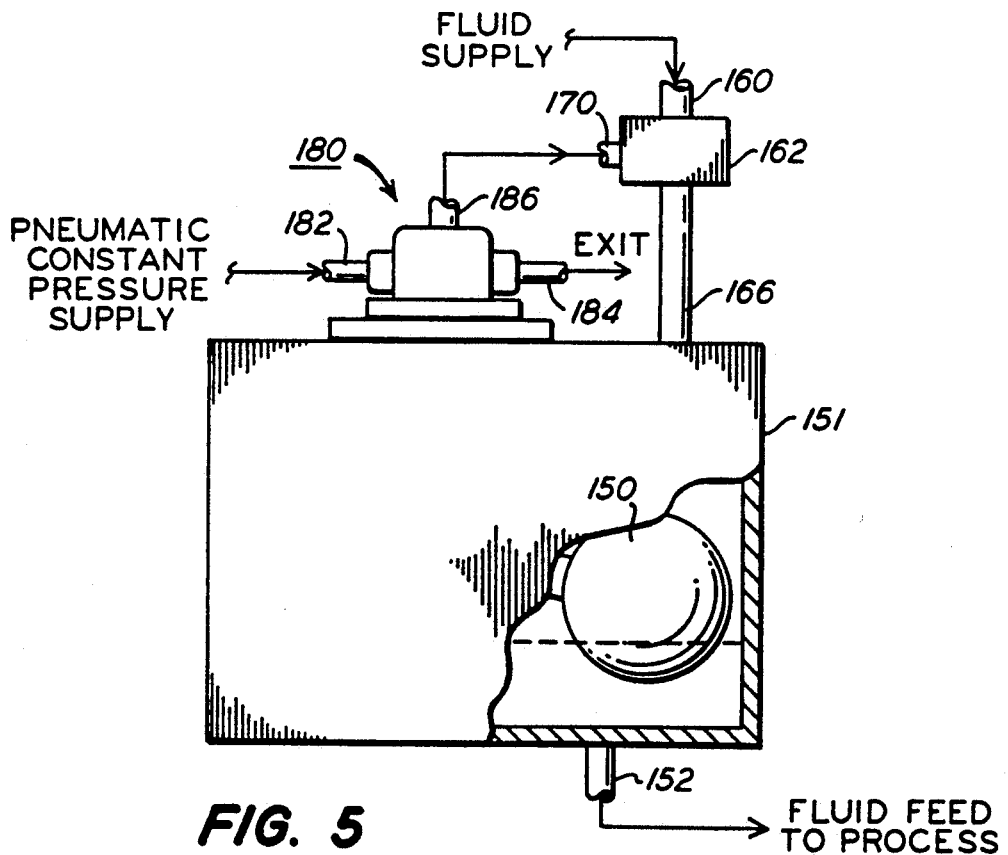

The float controlled valve of this invention is also usefully employed in providing controlled fluid flow from a reservoir to an industrial process. As shown in FIG. 5, a sealed tank 150 is provided, having a fluid outlet 152 for providing a continuous flow of fluid to a process. Fluid is supplied to tank 150 intermittently from a fluid supply 160, and controlled by an air, pilot-operated normally closed valve 162, connected to an inlet 166, of tank 150. Valve 162 is operative to close and prevent the flow of fluid from supply 160 to inlet 166, when no pressure is applied to valve control input 170. A float controlled valve assembly 180 in accordance with this invention is mounted through an opening in the top of tank 150, as shown. A source of constant pressure air is applied to pilot valve input 182, and output 184 is connected to ambient air. Switchable outlet 186 is connected to inlet 170 of the air pilot operated normally closed valve. In operation, when the level of fluid in tank 150 falls below a predetermined point, pilot valve 180 turns on, that is to say, supplies a source of compressed air to outlet 186 to open pilot-operated, normally closed valve 162, and allow the tank to fill. When the tank is filled to a second, higher, preselected level, the float controlled valve turns off the supply of compressed air to outlet 186, connects outlet 186 and thus inlet 170 to exit 184, and thus to atmospheric pressure to cause pilot operated normally closed valve 162 to close. In this way, a constant supply of fluid is available within tank 150 to feed the ongoing process via outlet 152.

While the invention has been described in connection with a number of presently preferred embodiments thereof, those skilled in the art will recognize that a multiplicity of changes may be made therein, without departing from the true spirit and scope of the invention, which accordingly is intended to be defined solely by the appended claims.

What is claimed is:

1. A float controlled valve comprising:
  a float chamber for accumulating a fluid;
  a pivotable float arm mounted on first fixed pivot means and having a float mounted thereon for fluid level determined movement without the chamber;
  a pivotally mounted actuator arm mounted on second pivot means spaced from the first pivot means, coupled to the float arm and having a first magnet mounted at one end of the actuator arm;
  a pivotally mounted control arm having a second magnet attached thereto in magnetic repelling coupling relationship with the first magnet; and
  valve means coupled to the pivotally mounted control arm for controlling fluid flow from the chamber in response to movement of the float.

2. The float controlled valve of claim 1 further comprising bracket means within the float chamber for mounting the pivotable float arm and the actuator arm.

3. The valve of claim 2 in which said bracket comprises the first and the second pivot means for mounting the float arm and the actuator arm respectively.

4. A float controlled valve comprising:
  a float chamber for accumulating a fluid;
  a pivotable float arm mounted on first fixed pivot means and having a float mounted thereon for fluid level determined movement within the chamber;
  a pivotally mounted actuator arm mounted on a second pivot spaced from the first fixed pivot means and coupled to the float arm and having a first magnet mounted at one end of the actuator arm;
  a pivotally mounted control arm having a second magnet attached thereto in magnetic repelling relationship with the first magnet with like poles in close proximity;

first and second colinear opposed valve assemblies; and valve shuttle means disposed between the first and second valve assemblies, and coupled to the pivotally mounted control arm for alternately opening one valve assembly and closing the other, depending upon the position of the control arm.

5. The float controlled valve of claim 1 in which said float chamber comprises a sealed pressurizable float chamber.

6. The float controlled valve of claim 5 further comprising magnetically permeable pressure sealing means disposed between the first and second magnets.

7. The valve of claim 6 in which said first magnet is located substantially within the float chamber, and said second magnet is located outside the float chamber.

8. The float controlled valve of claim 1 further comprising pressure operated drain valve means coupled to the float chamber, for controllably draining fluid from the chamber.

9. The float controlled valve of claim 8 in which the valve means comprises means for selectively pressurizing the pressure operated drain valve in response to movement of the pivotally mounted control arm.

10. The float controlled valve of claim 3 comprising linkage means connecting the pivotable float arm to the pivotally mounted actuator arm.

11. The float controlled valve of claim 10 wherein said linkage means comprises hysteresis means for changing the effective coupling between the float arm and the actuator arm, depending upon whether the float is rising or falling in the fluid.

12. The float controlled valve of claim 11 in which said hysteresis means comprises a pin on said pivotally mounted actuator arm;
an actuating bracket coupled to the float arm; and
a slot in the actuating bracket engaging the pin, the slot having a width substantially wider than the pin.

13. A pressure operated pump comprising:
a pressurizable pump chamber for accumulating a fluid;
a pivotable float arm mounted on a first fixed pivot means and having a float mounted thereon for fluid level determined movement within the pump chamber;
a pivotally mounted actuator arm mounted on a second pivot means spaced from the first fixed pivot means and coupled to the float arm and having a first magnet mounted at one end of the actuator arm;
a pivotally mounted control arm having a second magnet attached thereto in magnetic repelling coupling relationship with the first magnet;
a source of pressurized air; and
valve means coupled to the pivotally mounted control arm and connected between the source of pressurized air and the pump chamber for controlling pressurization of the chamber from the source of pressurized air in response to movement of the float.

14. The pressure operated pump of claim 13 further comprising bracket means within the pump chamber for mounting the pivotable float arm and the actuator arm.

15. The pressure operated pump of claim 14 in which said bracket means comprises the first and second pivot means for mounting the float arm and the actuator arm respectively.

16. A pressure operated pump comprising:
a pressurizable pump chamber for accumulating a fluid;
a pivotable float arm mounted on a first fixed pivot means and having a float mounted thereon for fluid level determined movement within the pump chamber;
a pivotally mounted actuator arm mounted on a second pivot means spaced from the first fixed pivot means and coupled to the float arm and having a first magnet mounted at one end of the actuator arm;
a pivotally mounted control arm having a second magnet attached thereto in magnetic coupling relationship with the first magnet;
first and second colinear opposed valve assemblies; and
valve shuttle means disposed between the first and second valve assemblies, and coupled to the pivotally mounted control arm for alternately opening one valve assembly and closing the other, depending upon the position of the control arm.

17. The pump of claim 16 further comprising magnetically permeable pressure sealing means disposed between the first and second magnets.

18. The pump of claim 1 in which said first magnet is located substantially within the pump chamber, and said second magnet is located outside the pump chamber.

19. The pump of claim 15 comprising linkage means connecting the pivotable float arm to the pivotally mounted actuator arm.

20. The pump of claim 19 wherein said linkage means comprises hysteresis means for changing the effective coupling between the float arm and the actuator arm, depending upon whether the float is rising or falling in the fluid.

21. The pump of claim 20 in which said hysteresis means comprises a pin on said pivotally mounted actuator arm;
an actuating bracket coupled to the float arm; and
a slot in the actuating bracket engaging the pin, the slot having a width substantially wider than the pin.

22. A float controlled fluid feed system comprising:
a float chamber for accumulating a fluid;
a pivotable float arm having a float mounted thereon and mounted on first fixed pivot means, for fluid level determined movement within the chamber;
a pivotally mounted actuator arm mounted on second pivot means spaced from the first fixed pivot means, the actuator arm coupled to the float arm and having a first magnet mounted at one end of the actuator arm;
a pivotally mounted control arm having a second magnet attached thereto in magnetic repelling coupling relationship with the first magnet; and
valve means coupled to the pivotally mounted control arm for controlling fluid flow from the chamber in response to movement of the float.

23. The float controlled fluid feed system of claim 22 further comprising bracket means within the float chamber for mounting the pivotable float arm and the actuator arm.

24. The float controlled fluid feed system of claim 23 in which said bracket comprises spaced apart pivot means for mounting the float arm and the actuator arm respectively.

25. A float controlled fluid feed system comprising:
a float chamber for accumulating a fluid;
a pivotable float arm having a float mounted thereon and mounted on first fixed pivot means, for fluid level determined movement within the chamber;
a pivotally mounted actuator arm mounted on second pivot means spaced from the first fixed pivot means, the actuator arm coupled to the float arm and having a first magnet mounted at one end of the actuator arm;
a pivotally mounted control arm having a second magnet attached thereto in magnetic repelling relationship with the first magnet with like poles in close proximity;
first and second colinear opposed valve assemblies; and
valve shuttle means disposed between the first and second valve assemblies, and coupled to the pivotally mounted control arm for alternately opening one valve assembly and closing the other, depending upon the position of the control arm.

26. The float controlled fluid feed system of claim 22 in which said float chamber comprises a sealed pressurizable float chamber.

27. The float controlled fluid feed system of claim 26 further comprising magnetically permeable pressure sealing means disposed between the first and second magnets.

28. The float controlled valve of claim 27 in which said first magnet is located substantially within the float chamber, and said second magnet is located outside the float chamber.

29. The float controlled valve of claim 22 further comprising pressure operated supply valve means coupled to a source of fluid and to the float chamber, for controllably supplying fluid to the chamber.

30. The float controlled fluid feed system of claim 32 in which the valve means comprises means for selectively pressurizing the pressure operated supply valve in response to movement of the pivotally mounted control arm.

31. The float controlled fluid feed system of claim 24 comprising linkage means connecting the pivotable float arm to the pivotally mounted actuator arm.

32. The float controlled fluid feed system of claim 31 wherein said linkage means comprises hysteresis means for changing the effective coupling between the float arm and the actuator arm, depending upon whether the float is rising or falling in the fluid.

33. The float controlled fluid feed system of claim 32 in which said hysteresis means comprises a pin on said pivotally mounted actuator arm;
an actuating bracket coupled to the float arm; and
a slot in the actuating bracket engaging the pin, the slot having a width substantially wider than the pin.

* * * * *